United States Patent [19]

Smith

[11] 4,108,497
[45] Aug. 22, 1978

[54] HUB CAP

[75] Inventor: Bruce N. Smith, Seabrook, N.H.

[73] Assignee: Spherex, Inc., Seabrook, N.H.

[21] Appl. No.: 755,163

[22] Filed: Dec. 29, 1976

[51] Int. Cl.² .............................................. B60B 7/06
[52] U.S. Cl. .............................................. 301/37 SA
[58] Field of Search ............. 301/37 SA, 108 R, 120, 301/121

[56] References Cited

U.S. PATENT DOCUMENTS

| 2,152,253 | 3/1938 | Greene, Sr. | 301/108 R |
| 3,034,833 | 5/1962 | Ares | 301/37 SA |

FOREIGN PATENT DOCUMENTS

| 708,094 | 4/1965 | Canada | 301/121 |
| 707,015 | 4/1931 | France | 301/37 SA |
| 1,184,976 | 2/1959 | France | 301/121 |
| 1,049,790 | 11/1966 | United Kingdom | 301/121 |
| 1,141,067 | 1/1969 | United Kingdom | 301/121 |

Primary Examiner—Robert B. Reeves
Assistant Examiner—Charles A. Marmor
Attorney, Agent, or Firm—Norman S. Blodgett; Gerry A. Blodgett

[57] ABSTRACT

Hub cap in the form of a cup-like cap having laterally notched fingers extending from the skirt for engagement with the spokes of a wheel and having a transversely-slidable internal locking plate for engagement with a notched axle to assemble axle, cap, and wheel together.

5 Claims, 5 Drawing Figures

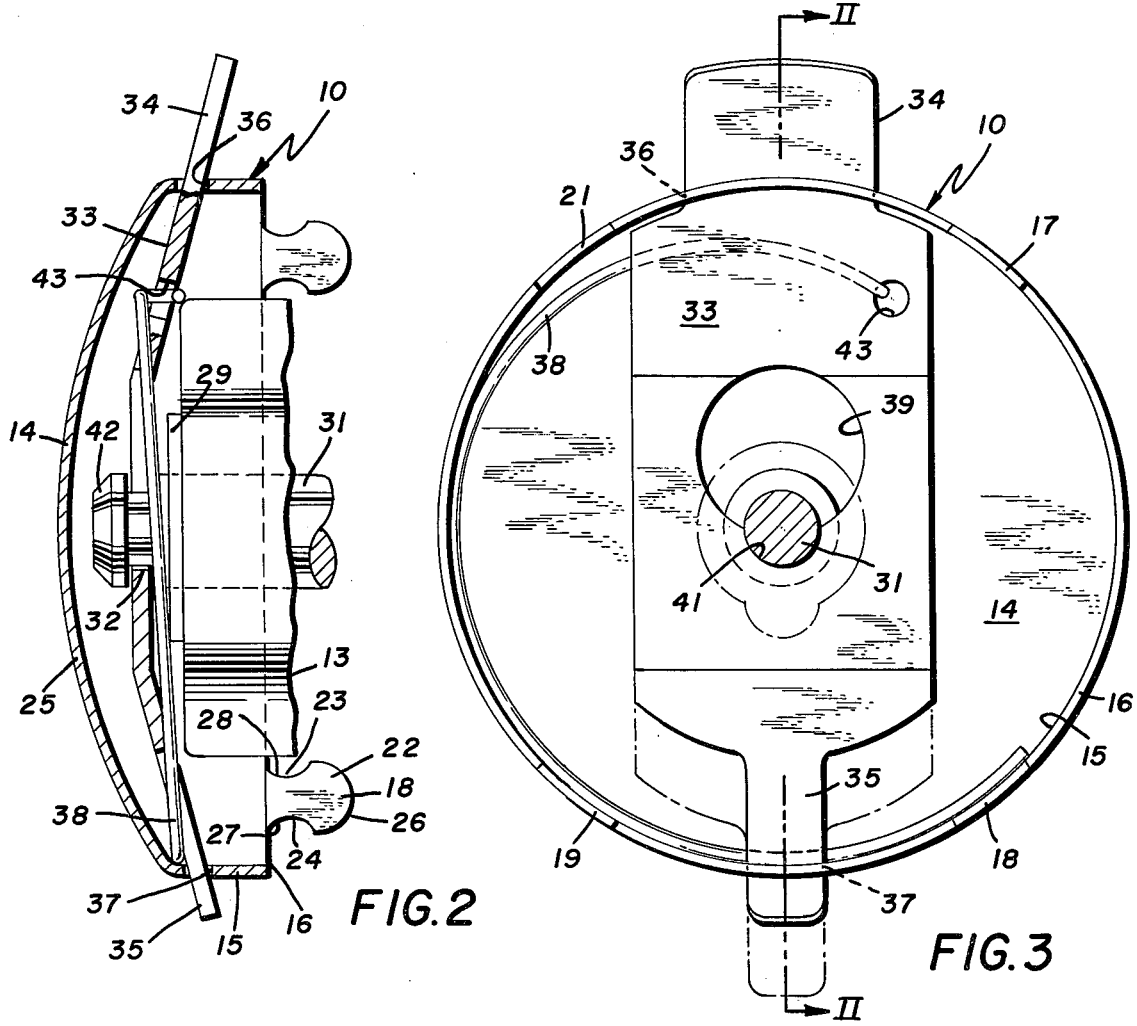
FIG. 2
FIG. 3
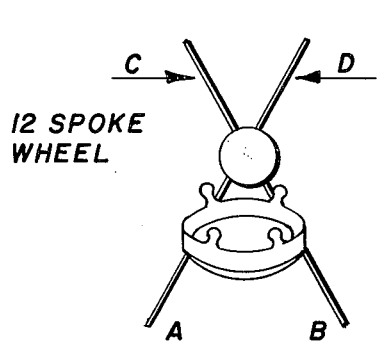
12 SPOKE WHEEL
FIG. 4
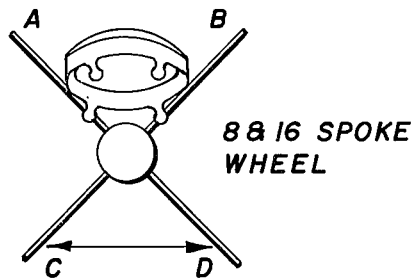
8 & 16 SPOKE WHEEL
FIG. 5

4,108,497

HUB CAP

BACKGROUND OF THE INVENTION

In the conventional construction of small wheeled vehicles, such as baby carriages and tricycles, the axle is usually locked within the hub of the wheel by use of a fastener such as a cotton pin. It is then common practice to provide a hub for the sake of appearance, since the cap serves no structural purpose in connection with the wheel. Furthermore, in most constructions, the hub cap is peculiarly constructed to attach to the hub of the wheel, so that it is necessary to produce a different hub cap for each type of wheel. This is particularly true because of the fact that the wheels come with 8, 12, or 16 spokes and that no hub cap will fit all three types. Also, it is common for the hub caps to become dislodged, either during shipment or during use, and this reflects on the reputation of the manufacturer. Furthermore, the old type of construction is labor-intensive (which adds to the cost of the vehicle) and uses a complex construction which also adds to the cost. These and other difficulties experienced with the prior art devices have been obviated in a novel manner by the present invention.

It is, therefore, an outstanding object of the invention to provide a hub cap for use with a spoked wheel which cap can be applied to wheels having 8, 12, or 16 spokes.

Another object of this invention is the provision of a hub cap which serves to connect a spoked wheel to its axle.

A further object of the present invention is the provision of a device for joining an axle to the hub of a wheel, which device also acts as an ornamental cap.

It is another object of the instant invention to provide a hub cap for use with a spoked wheel, which cap is simple in construction, which is inexpensive to manufacture, and which is capable of a long life of useful service with a minimum of maintence.

A still further object of the invention is the provision of a hub cap assemblage for joining a wheel and its axle, which construction uses relatively little labor and that labor is unskilled.

It is a further object of the invention to provide a hub cap assembly system for wheeled vehicles which will permit shipping in an unassembled state and will permit rapid and simple reconstruction by the purchaser.

It is a still further object of the present invention to provide a hub cap for ornamentation of a spoked wheel, which cap also serves to lock the wheel on the axle.

With these and other objects in view, as will be apparent to those skilled in the art, the invention resides in the combination of parts set forth in the specification and covered by the claims appended hereto.

SUMMARY OF THE INVENTION

In general, the invention consists of a hub cap for use on a wheel having a plurality of spokes extending radially from a central hub. It is provided with a central main body from the periphery of which extends a skirt. A plurality of fingers extend axially from the edge of the skirt, each finger having an enlarged outer end defining a notch on each side for engagement with a spoke. The main body of the skirt and the fingers are integrally formed of sheet metal. The fingers and their notches are suitably spaced, so that facing notches of an adjacent pair of fingers will snap tightly around a pair of spokes of a 12 spoke-wheel, while the oppositely-facing notches of the same pair of fingers snap between a similar pair of spokes of an 8 to 16 spoke-wheel. The hub cap is used with an axle having a groove extending around it adjacent the outer end and a locking plate is mounted in the hub cap for sliding motion transversely thereof and is provided with an aperture through which the axle extends, the edge of the aperture locking in the notch.

More specifically, the locking plate is in the form of a narrow strip of metal having end portions of reduced width which slide in slots in the main body of the cap, while a spring acts to bias the locking plate toward one end. The aperture in the plate consists of a circular portion having a diameter slightly larger than the diameter of the axle and a notch extending from it on the side away from the end toward which the locking plate is biased, which notch is generally semi-circular with a diameter the same as the root of the groove in the axle. The spring consists of a length of stiff wire, one end of which engages an aperture in the locking plate and the remainder of which loops around the interior of the cap and is maintained in place by the plate itself, while pressing against the interior of the cap at the portion away from the end of the locking plate toward which it is biased. The end of the axle is provided with a frusto-conical shape to facilitate entry into the aperture in the locking plate.

BRIEF DESCRIPTION OF THE DRAWINGS

The character of the invention, however, may be best understood by reference to one of its structural forms, as illustrated by the accompanying drawings, in which:

FIG. 2 is a sectional view of the hub cap taken on the line II—II of FIG. 3, FIG. 3 is an elevational view of the hub cap taken from the inside of the wheel of line III—III of FIG. 1, FIG. 4 is a somewhat schematic view showing the manner in which the hub cap is applied to a 12-spoke wheel, and FIG. 5 is a schematic view showing the manner in which the hub cap is applied to an 8 or 16 spoke-wheel.

DESCRIPTION OF THE PREFERRED EMBODIMENT

Figure 1:
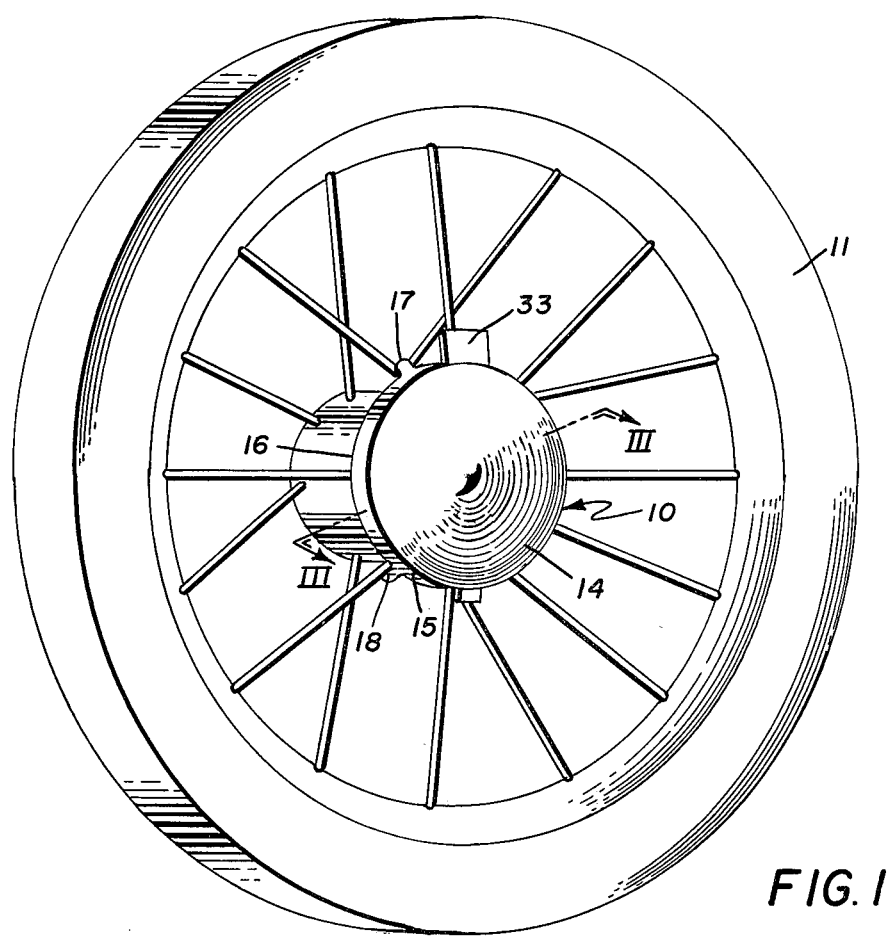
FIG. 1 is a perspective view showing the hub cap incorporating the principles of the present invention in use with a spoked wheel.

Referring first to FIG. 1, wherein are best shown the general features of the invention, the hub cap, indicated generally by the reference numeral 10, is shown in use with a wheel 11 having spokes 12, which extend radially from a central hub (see FIG. 2).

The hub cap is provided with a circular main body 14 from the periphery of which extends a tubular skirt 15 terminating in an edge 16 which lies in a plane perpendicular to the axis of the wheel. Extending axially of the skirt 15 from the edge 16 are four fingers 17, 18, 19, and 21. Also evident in FIG. 1 and extending from the skirt 15 of the hub cap is a locking plate 33 which will be described more fully hereinafter.

Referring next to FIGS. 2 and 3, the finger 18 is typical of all of the fingers; it has an enlarged outer end 22 thereby defining a notch 23 on one side and a notch 24 on the other side. More specifically, the enlarged outer end of the finger is provided with a semi-circular edge 26 which is convex in nature. Extending from the ends of the edge 26 (and forming cusps herewith) are semi-circular concave edges 27 and 28 defining the notches 24 and 23, respectively. It is particularly evident in FIG. 2 that the main body 14 is provided with a spherical outer surface 25. In the preferred embodiment, the entire main body, skirt, and fingers are integral and are stamped from sheet steel. As is most obvious in FIG. 3, the skirt 15 and all of the fingers lie on a cylindrical surface which is concentric with the axis of the main body 14.

The arrangement of the fingers and the dimensions of the notches is quite important. The facing notches of the fingers 17 and 21 (at the top of FIG. 3) are dimensioned so that the fingers can be snapped inside of a first pair of spokes 12 on a 16-spoke wheel (as well as an 8-spoke wheel), while the other pair of fingers 18 and 19 in the lower part of FIG. 3 have their notches spaced so that they fit on either side of a second pair of spokes of that same wheel, the second pair of spokes being diametrically opposite the first pair of spokes. At the same time, the dimensions of the fingers and their notches are such that the pair of fingers 17 and 21 fit outside of a pair of spokes of a 12-spoke wheel, while the other pair of fingers 18 and 19 fit outside of a diametrically-opposed pair on the same wheel. In either case, the hub cap snaps onto diametrically opposed pairs of spokes, but in the case of the 12-spoke wheel they snap around the pair of spokes, while in the case of the 8 or 16-spoke wheel they snap inside of the pair.

In FIG. 2 it can be seen that the hub 13 is provided with a bearing 29 which, in the preferred embodiment, is a nylon sleeve. Through this bearing extends an axle 31 having a narrow groove extending entirely around it adjacent its free end, the free end being provided with a frusto-conical surface 42. As is evident in FIG. 3, the locking plate 33 is a strip of sheet steel having a relatively narrow portion 34 at the upper end and a relatively narrow portion 35 at the other end, each narrow portion residing in a transverse slot on the skirt of the hub cap. The portion 34 is considerably wider than the portion 35 and, therefore, it resides in a longer slot 36, while the portion 35 extends through a shorter slot 37. It can be seen then that, because of the entrapment of the portion 34 in its slot 36 and the portion 35 in its slot 37, the locking plate 33 is slidable transversely of the axis of the axle. The locking plate is resiliently biased in the direction of the portion 34 by a spring 38 which is in the form of a length of moderately stiff wire.

Now, the looking plate 33 has a central circular aperture 39 which has a diameter somewhat larger than the diameter of the axle 31 and from this circle extends a notch 41 in the shape of a segment of a circle whose diameter is approxiamtely the same as the root diameter of the groove 32 in the axle. The notch 41 is located on the side of the aperture 39 away from the portion 34, that is to say, away from the direction in which the spring 38 biases the locking plate. This notch normally engages the root of the groove 32 in the axle and locks the axle and hub cap together. The spring 38 is locked at one end in a small aperture 43 in the locking plate and extends under the locking plate around the periphery of the apron or skirt of the hub cap under the plate 33 and is slightly compressed in an arc to bring about the biasing motion toward the portion 34 of the locking plate.

The manner of operation and the advantages of the present invention will now be readily understood in view of the above description. In assembling the parts, let us assume that the wheel 11 has 12 spokes so that the hub cap 10 (when applied to the wheel) has the appearance shown in FIG. 4. A suitable pair of spokes 12 is selected and the fingers 17 and 21 are located around a narrow portion of the spokes and slid outwardly until the fingers embrace the two spokes so that the spokes are squeezed inwardly between the facing notches and rest against the concave inner surface of the two fingers. The hub cap is then rotated until the other two fingers 18 and 19 engage the diametrically-opposite pair of spokes and as the hub cap is pressed further inwardly, the spokes are cammed inwardly along the semi-circular edges 26 of each finger and the spokes are squeezed inwardly until they pass over the cusp. As the hub cap is pushed in place against the pair of spokes, the spokes pass over the outer convex edge, cam over the junction or cusp between the convex edge 26 and the concave edges 27 and 28 and fall down into the notches 23 and 24 where they are locked in place. The hub cap is now firmly attached because of the clamping of two fingers around one pair of spokes and the other two fingers around another pair of spokes.

The axle is then introduced through the bearing 29 in the hub and, as it emerges from the bearing, it engages the edge of the aperture 39 adjacent the notch 41. As a matter of fact, the frusto-conical surface 42 on the end of the axle engages the locking plate and cams it in the direction of the narrow portion 35. This camming action takes place against the biasing provided by the spring 38. The axle, of course, does not enter the notch 41 appreciably, because the notch diameter is so much smaller than that of the axle. Eventually, however, as the axle proceeds through the aperture 39 the plane of the groove 32 arrives at the plane of the locking plate and the plate (under the impetus of the spring) enters the groove until the edge of the notch 41 fully engages the root of the groove. At that time the hub cap is locked to the wheel by the fingers embracing the spokes, so that the wheel, axle, and hub cap are firmly fastened together. The wheel and the hub cap are, or course, free to rotate relative to the axle because the engagement of the notch in the locking plate with the groove 32 is relatively friction-free.

If it is necessary to remove the wheel at any time (for instance, to replace the bearing in the hub, or, to oil it or for various other reasons, such as replacing a wheel which has been damaged with a new wheel), it is only necessary to press on the end portion 34 of the locking plate and press it against the bias of the spring, that is to say, in the direction of the portion 35. The locking plate then slides transversely and the notch 41 slides laterally out of the groove 32. The axle is then located in the main aperture 39 and is free to be withdrawn from the bushing or bearing in the hub. At that time, it a simple matter to pry the hub cap away from the spokes by compressing the spokes together. It can be seen that the assembly or dis-assembly of the three pieces, i.e., the wheel, the hub cap, and the axle, can be carried out very readily by unskilled labor, or by the ultimate consumer himself. There are no intricate connections which can rust and become inoperative over the years. Each of the elements of the combination is relatively simple and inexpensive to manufacture, so that it can be replaced without great expense. The hub cap with its simple method of attachment to the wheel is pleasing in appearance and the connection is very firm and positive so that it is unlikely to be jarred from its position by simple accidental engagement. There are no dangerous sharp corners to injure the user.

The application of the hub cap to an 8 or 16-spoke wheel differs from the above-described only in that the pair of fingers is snapped between a pair of spokes instead of around them. The sliding and the snapping over the cusp between the convex end edge and the concave notch edge is the same. It can be seen, then, that the hub cap of a single manufacture can be used on a large variety of wheels having various numbers of spokes and having various types and sizes of hubs. The size of the hub cap relative to the size of the wheel is not critical, so that the same hub cap can be used on a variety of sizes of wheels. The manufacturer of wheeled vehicles need keep in stock only a limited number of types of hub caps in order to operate with a wide variety of wheels, whether the variation be in the number of spokes, the size of the wheel, or the type of hub.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Hub cap for use on a wheel having a plurality of spokes extending radially from a central hub, comprising
   (a) a circular main body,
   (b) a skirt extending from the periphery of the main body, and
   (c) four fingers extending from the skirt, each finger having an enlarged outer end defining a notch on each side for engagement with a spoke, the facing notches of one pair of fingers being spaced for close engagement with a pair of spokes of a 12-spoke wheel which spokes are equidistant, and which are attached alternately from the outer wheel rim to opposite ends of the wheel hub, and the facing notches of the other pair are similarly spaced for engagement with another pair of spokes of the wheel located in a diametrically-located position, while the outer notches of the said one pair are spaced to fit tightly between a pair of spokes of an 8-spoke or 16-spoke wheel which spokes are equidistant, and which are attached alternately from the outer wheel rim to opposite ends of the wheel hub, and the outer notches of the same other pair are similarly spaced to fit tightly between another pair of spokes of the wheel located diametrically across the wheel.

2. Hub cap as recited in claim 1, wherein the main body has spherical surface.

3. Hub cap as recited in claim 1, wherein the main body, the skirt, and the fingers are integrally formed of sheet metal.

4. Hub cap as recited in claim 3, wherein the skirt and fingers lie on a cylindrical surface which is concentric with the main body.

5. Hub caps as recited in claim 1, wherein the enlarged outer end of each finger has a semi-circular convex edge whose ends meet semi-circular concave edges of the notches.

* * * * *